(12) United States Patent
Roche et al.

(10) Patent No.: US 9,491,328 B2
(45) Date of Patent: Nov. 8, 2016

(54) SYSTEM AND METHOD FOR SETTING OUTPUT PLEX FORMAT USING AUTOMATIC PAGE DETECTION

(71) Applicant: Xerox Corporation, Norwalk, CT (US)

(72) Inventors: Lee D. Roche, Pittsford, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/634,753

(22) Filed: Feb. 28, 2015

(65) Prior Publication Data

US 2016/0255236 A1    Sep. 1, 2016

(51) Int. Cl.
| | | |
|---|---|---|
| G06F 3/12 | (2006.01) | |
| G06K 15/00 | (2006.01) | |
| H04N 1/00 | (2006.01) | |
| H04N 1/203 | (2006.01) | |

(52) U.S. Cl.
CPC .................................. H04N 1/2032 (2013.01)

(58) Field of Classification Search
None
See application file for complete search history.

(56) References Cited

U.S. PATENT DOCUMENTS

| | | | |
|---|---|---|---|
| 4,332,464 A | | 6/1982 | Bartulis et al. |
| 4,575,227 A | | 3/1986 | Ito et al. |
| RE32,253 E | | 9/1986 | Bartulis et al. |
| 4,669,858 A | | 6/1987 | Ito et al. |
| 4,727,402 A | * | 2/1988 | Smith .................... G03G 15/23 355/24 |
| 4,794,429 A | * | 12/1988 | Acquaviva ............. B65H 5/224 271/197 |
| 4,814,822 A | * | 3/1989 | Acquaviva ............. G03G 15/23 355/133 |
| 4,849,789 A | | 7/1989 | Ito et al. |
| 4,918,490 A | * | 4/1990 | Stemmle ............... G03G 15/234 271/291 |
| 4,941,023 A | * | 7/1990 | Holmes ................ G03G 15/234 271/288 |
| 4,949,949 A | * | 8/1990 | Holmes .............. G03B 27/6257 271/184 |
| 4,956,672 A | | 9/1990 | Shibazaki et al. |
| 4,974,035 A | * | 11/1990 | Rabb .................. G03B 27/6257 399/364 |
| 5,095,342 A | * | 3/1992 | Farrell ................. G03G 15/234 355/23 |
| 5,159,395 A | * | 10/1992 | Farrell ................. G03G 15/234 271/291 |
| 5,182,796 A | | 1/1993 | Shibayama et al. |
| 5,189,529 A | | 2/1993 | Ishiwata et al. |
| 5,271,065 A | * | 12/1993 | Rourke .................. G06K 15/00 358/1.18 |
| 5,337,135 A | * | 8/1994 | Malachowski ...... G03G 15/234 271/270 |
| 5,396,344 A | * | 3/1995 | Kimura ................ H04N 1/3248 358/444 |
| 5,452,068 A | * | 9/1995 | Farrell .................. G03G 15/50 399/367 |

(Continued)

*Primary Examiner* — Madelein Nguyen
(74) *Attorney, Agent, or Firm* — Michael J. Nickerson; Basch & Nickerson LLP

(57) ABSTRACT

A method and system prints an output document from an original document having multiple input sheets, each input sheet having a front side and a back side, the output document having multiple output sheets, each output sheet having a front side and a back side, the output sheet of the output document having a same plex as a plex of a corresponding input sheet. The method and system also prints an output document from an original document having multiple input sheets, wherein all output sheets of the output document are simplex. Further, the method and system prints an output document from an original document having multiple input sheets, wherein all output sheets of the output document are duplex.

1 Claim, 9 Drawing Sheets

(56) References Cited

U.S. PATENT DOCUMENTS

| | | | |
|---|---|---|---|
| 5,463,448 A | 10/1995 | Wilson et al. | |
| 5,495,581 A * | 2/1996 | Tsai | G06F 17/30017 358/400 |
| 5,528,374 A * | 6/1996 | Matias | G06K 15/00 358/296 |
| 5,583,981 A | 12/1996 | Pleyer | |
| 5,585,891 A | 12/1996 | Altrieth et al. | |
| 5,594,740 A | 1/1997 | LaDue | |
| 5,614,993 A | 3/1997 | Smith et al. | |
| 5,727,129 A | 3/1998 | Barrett et al. | |
| 5,880,727 A | 3/1999 | Barrett et al. | |
| 5,978,620 A | 11/1999 | Syeda-Mahmood | |
| 6,018,398 A * | 1/2000 | Bunker | G06K 15/00 358/1.15 |
| 6,324,555 B1 * | 11/2001 | Sites | G06F 17/21 707/E17.008 |
| 6,411,787 B1 | 6/2002 | Frederiksen et al. | |
| 6,522,791 B2 | 2/2003 | Nagarajan | |
| 6,678,485 B1 | 1/2004 | Odani | |
| 6,728,006 B1 * | 4/2004 | Dahanayaka | H04N 1/32037 358/1.18 |
| 6,859,287 B1 | 2/2005 | Frederiksen et al. | |
| 7,043,191 B2 | 5/2006 | Fujii et al. | |
| 7,061,637 B2 * | 6/2006 | Mochimaru | G06K 15/00 347/104 |
| 7,352,490 B1 * | 4/2008 | Tse | H04N 1/3871 358/1.9 |
| 7,843,582 B2 * | 11/2010 | Burlingame | H04N 1/32358 358/1.15 |
| 8,264,752 B2 * | 9/2012 | Katsuyama | G06F 3/147 358/1.12 |
| 2001/0043346 A1 * | 11/2001 | Roztocil | G06F 17/212 358/1.9 |
| 2002/0041384 A1 * | 4/2002 | Moriura | H04N 1/506 358/1.9 |
| 2003/0038988 A1 * | 2/2003 | Anderson | H04N 1/00803 358/474 |
| 2004/0194033 A1 * | 9/2004 | Holzwarth | G06F 17/211 715/274 |
| 2005/0094208 A1 * | 5/2005 | Mori | G06F 17/24 358/1.18 |
| 2005/0200903 A1 * | 9/2005 | Okubo | G06K 9/00456 358/3.24 |
| 2006/0001896 A1 * | 1/2006 | Sakamoto | G06F 3/1219 358/1.13 |
| 2006/0039627 A1 * | 2/2006 | Li | H04N 1/3878 382/289 |
| 2008/0049238 A1 * | 2/2008 | Nagarajan | G06K 9/38 358/1.9 |
| 2009/0257095 A1 * | 10/2009 | Delfer | H04N 1/00567 358/304 |
| 2010/0053682 A1 * | 3/2010 | Gotoh | H04N 1/00411 358/1.15 |
| 2010/0157351 A1 * | 6/2010 | Van De Capelle | B41J 13/0036 358/1.15 |
| 2011/0058231 A1 * | 3/2011 | Oshima | H04N 1/00204 358/474 |
| 2012/0120432 A1 * | 5/2012 | Hirohata | H04N 1/00474 358/1.13 |
| 2012/0147406 A1 * | 6/2012 | Yamaneki | H04N 1/00217 358/1.13 |
| 2013/0061134 A1 * | 3/2013 | Maehira | G06F 3/1208 715/251 |
| 2013/0135686 A1 * | 5/2013 | Abe | H04N 1/00819 358/406 |
| 2014/0029057 A1 * | 1/2014 | Sato | H04N 1/00832 358/1.18 |
| 2014/0078539 A1 * | 3/2014 | Kakitsuba | G06F 3/1204 358/1.13 |
| 2014/0376021 A1 * | 12/2014 | Nishiyama | H04N 1/00442 358/1.13 |
| 2014/0376022 A1 * | 12/2014 | Muraishi | H04N 1/00411 358/1.13 |
| 2015/0070729 A1 * | 3/2015 | Osada | H04N 1/38 358/1.18 |
| 2015/0146236 A1 * | 5/2015 | Enomoto | H04N 1/00867 358/1.14 |
| 2015/0242165 A1 * | 8/2015 | Patock, Sr. | G06F 3/1219 358/1.15 |
| 2015/0242719 A1 * | 8/2015 | Kashiwagi | H04N 1/00 358/1.12 |
| 2015/0281490 A1 * | 10/2015 | Morikawa | H04N 1/00771 358/434 |
| 2015/0347070 A1 * | 12/2015 | Ha | H04N 1/00411 358/1.15 |
| 2015/0350470 A1 * | 12/2015 | Ha | H04N 1/00503 358/1.13 |
| 2016/0065773 A1 * | 3/2016 | Tashiro | H04N 1/00803 358/406 |

* cited by examiner

SYSTEM AND METHOD FOR SETTING OUTPUT PLEX FORMAT USING AUTOMATIC PAGE DETECTION

BACKGROUND

Currently digital copiers and digital multi-function printing devices have control panels and displays designed to support multiple functionalities. An example of a conventional digital multi-function printing device having a control panel and/or display supporting multiple functionalities is illustrated in FIG. 1.

FIG. 1 illustrates an overall construction of a digital multi-function printing device. The digital multi-function printing device, as illustrated in FIG. 1, includes a scanning station 35, a printing station 55, and a user interface 50. The digital multi-function printing device may also include a finisher device 45 that may be a sorter, tower mailbox, stapler, etc. The printing station 55 may include a plurality of paper trays 40 that store the paper used in the printing process. Lastly, the digital multi-function printing device may include a high capacity feeder 30 that is capable of holding large amounts of paper stock to be used by the machine.

In a typical scanning function, the operator would utilize the scanning station 30 to scan in the images from the original documents. This scanning station 30 may be a platen type scanner or may include a constant velocity transport system that moves the original documents across a stationary scanning device. Moreover, the scanning station 30 may also include a document handling system that is capable of placing the original documents, automatically, on the glass platen for scanning.

With respect to the printing functions, the printing station 55 would retrieve the proper paper from one of the multiple paper trays or the high capacity feeder, render the desired image on the retrieved paper, and output the printed image to the finishing device 45 for further operations. The user interface 50 allows the user to control the various functions of the digital multi-function printing device by presenting various types of screens to the user that provides the user an opportunity to program certain job characteristics or function characteristics.

An example of a basic conventional architecture of a digital multi-function printing device is illustrated in FIG. 2. As illustrated in FIG. 2, the architecture of the digital multi-function printing device includes a scanner 3 that converts an original image into a set of digital signals that can be either stored or reproduced. The scanner 3 is connected to a central bus system 1 which may be either a single bus or a plurality of buses that provide interconnections and intercommunications between the various modules and devices on a digital multi-function printing device.

The digital multi-function printing device, as illustrated in FIG. 2, further includes a digital printing device 23 which converts digital signals representing an image into a hardcopy of that image on a recording medium whether the recording medium is paper, transparency, or other type of markable medium. The digital multi-function machine also includes a memory 21 for storing a variety of types of digital information such as machine fault information, machine history information, digital images to be processed at a later time, instruction sets for the machine, job instruction sets, etc.

In addition to the memory 21, a conventional digital multi-function printing device includes an electronic pre-collation memory 7 that may store the digital representation of the image being presently rendered by the digital printing device 23. In the electronic pre-collation memory 7, the digital image is already laid out in its page structure so that it can be readily rendered by the digital printing device 23.

The digital multi-function printing device as illustrated in FIG. 2, further includes a user interface 5 which allows the user to select the various functions of the multi-function device, program various job attributes for the particularly selected function, provide other input to the multi-function device as well as display informational data from the digital multi-function printing device.

If the digital multi-function printing device were connected to a network, the digital multi-function printing device would include a network interface 19 and an electronic subsystem controller 9 that would control the inter-relationship between the various modules or devices on the digital multi-function printing device and the network.

To enable a facsimile function, a digital multi-function printing device could include, typically, a voice/data modem 11 and a telephone circuit board 13. Moreover, the digital multi-function printing device may include input/output drives 17 such as a floppy disc drive, a CD ROM drive, a tape drive, or other type of drive that can accept a portable memory device.

In some digital multi-function printing devices, the device also includes a finisher 29 which can perform certain operations upon the printed output from the printing device 23. Lastly, the digital multi-function printing device includes a controller 15 that controls all the functions within the multi-function device so as to coordinate all the interactions between the various modules and devices.

A user interface is an interactive electronic display which may have multiple levels on a screen, multiple screens, or a combination thereof. The user of such an interface user can navigate the user interface to select the desired user-programmable features or attributes. More specifically, the user may encounter a main copying screen and navigational buttons to get to other screens or layered screens so as to program different features or attributes associated with those navigational buttons.

For example, a main copying screen may have a navigational button associated with the feature of reduction/enlargement. By activating this navigational button, the user interface would display a screen that has a plurality of reduction/enlargement activatable buttons as well as other programmable areas that allow the user to program a variety of reduction/enlargement values.

FIG. 3 illustrates a conventional user interface that utilizes multiple screens and multiple layers of an interactive electronic display user interface, but which has a main copying screen from which a user can readily program a few desired commonly used features without requiring a user to navigate through a plurality of screens.

As illustrated in FIG. 3, the basic copy function screen 50 includes a message area 510, a navigational area 520, and a programmable area 530. In the message area 510, the digital copier will display various messages for the user informing the user of either the status of the machine or assists the user in programming a particular job.

In the navigational area 520, the user may select any of the activatable tabs 521 in order to bring the features associated with that tab forward onto the screen and allowing the present features to fall behind the activated or engaged tab.

Moreover, the navigational area 520 includes navigational buttons 522 which allow the user to navigate to other various screens for carrying out other functions with respect to the reprographic system such as maintenance functions, key operator programming functions, supervisory functions, or diagnostic functions, etc.

Lastly, the programmable area 530 of screen 50 includes a plurality of activatable areas wherein each activatable area is associated with a certain value, function, or linked screen.

For example, as illustrated in FIG. 3, activatable area 531 is associated with the preset reduction/enlargement value of 100%. On the other hand, activatable area 532 of FIG. 3 is associated with a linked screen. Thus, upon engagement or activation of the activatable area 532, the screen will be replaced with another screen.

Other activatable areas on the basic copy function screen 50 of FIG. 3 include reduction/enlargement preset activatable areas 533 and 534 that correspond to the preset reduction value 64% and 78%, respectively. Another activatable area with respect to reduction/enlargement on the basic copy function screen 50 is the activatable area 535 which corresponds to an auto-function in that when it is selected or engaged, the reprographic system will automatically size the scanned in image to fit properly upon the output recording medium.

Lastly, activatable areas 536 correspond to enabling a user to select the plex relationship between the plex of the input document and the plex of the output document. The plex may be simplex (one-sided), or the plex may be duplex (two-sided).

For example, if the input document was simplex (one-sided) and the user desired that the document be reproduced as a duplex (two-sided) document, the user would engage the "1→2 Sided" activatable area 536.

On the other hand, if the input document was duplex (two-sided) and the user desired that the document be reproduced as a simplex (one-sided) document, the user would engage the "2→1 Sided" activatable area 536.

However, although the conventional user interface provides many choices for selecting the plex relationship, the conventional user interface does not provide all the possible plex relationships.

Thus, it is desirable to provide a system that enables the user to select all the possible plex relationships.

Moreover, it is desirable to provide a system it is desirable to provide a system that enables the user to select all the possible plex relationships without overwhelming the user interface with too many choices.

BRIEF DESCRIPTION OF THE DRAWING

The drawings are only for purposes of illustrating various embodiments and are not to be construed as limiting, wherein.

DETAILED DESCRIPTION

Figure 1:
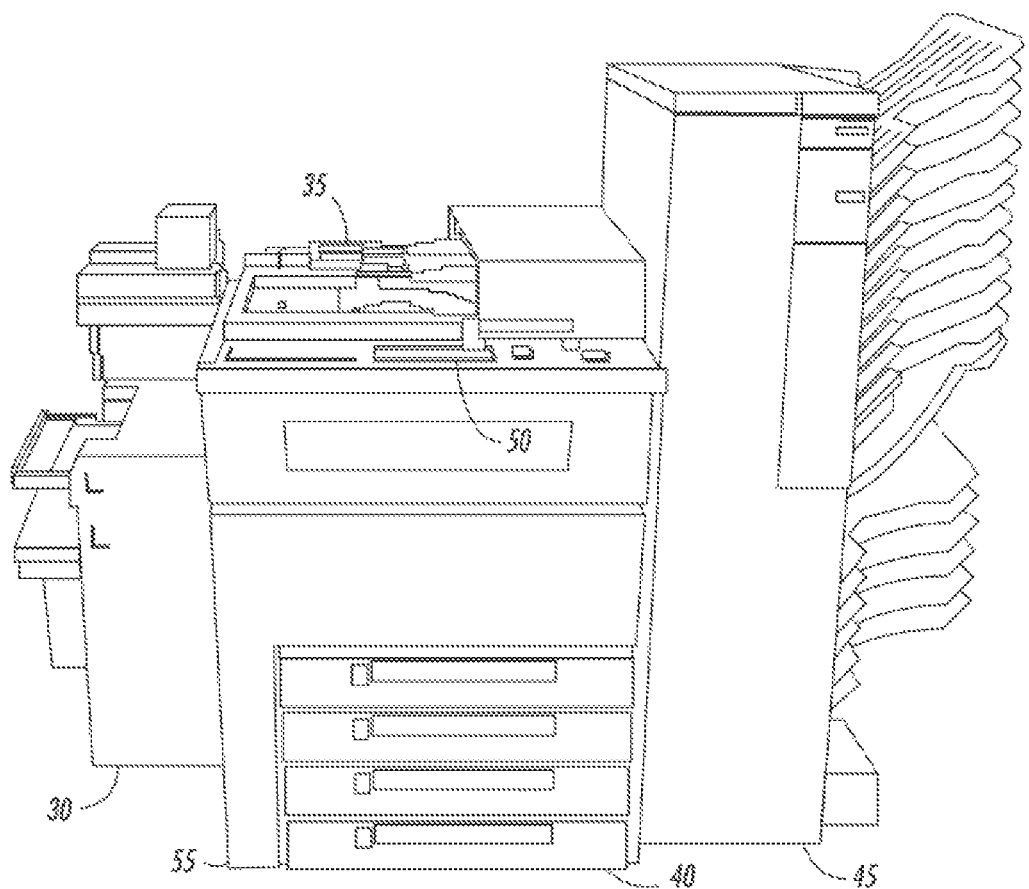
FIG. 1 is a graphic representation of a prior art digital multi-function device.
Figure 2:
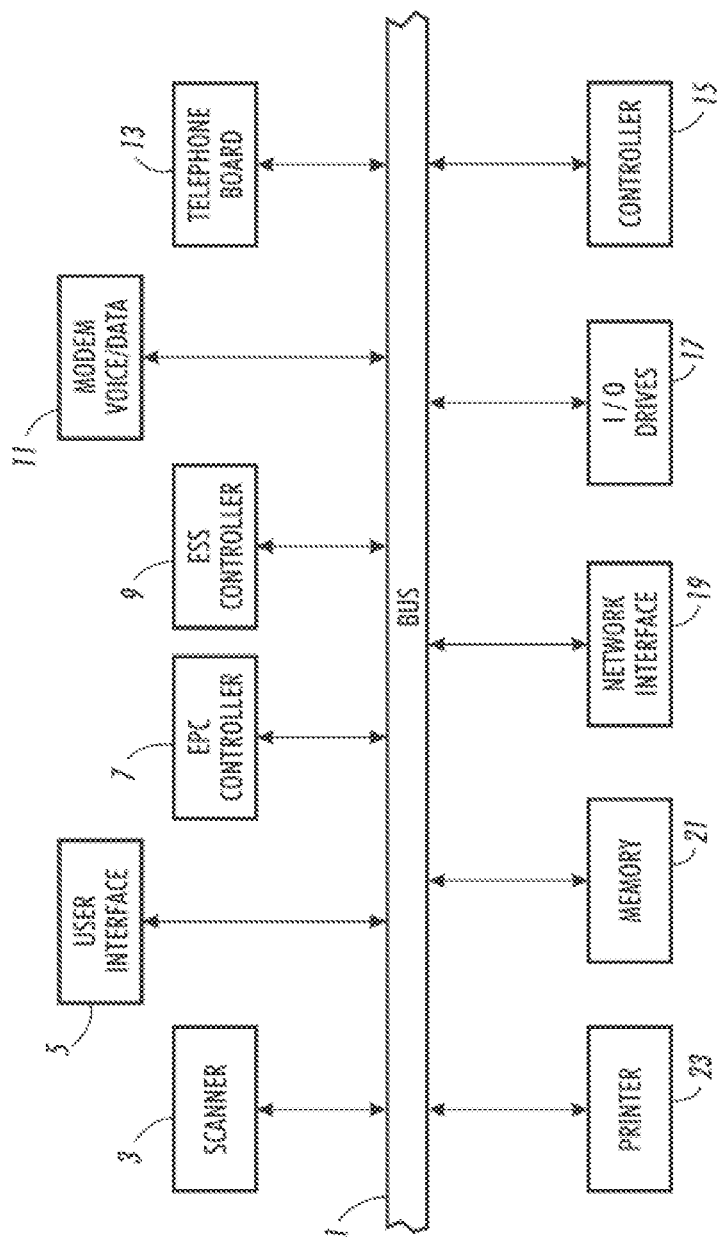
FIG. 2 is a block diagram illustrating the architecture of a prior art digital multi-function device.
Figure 3:
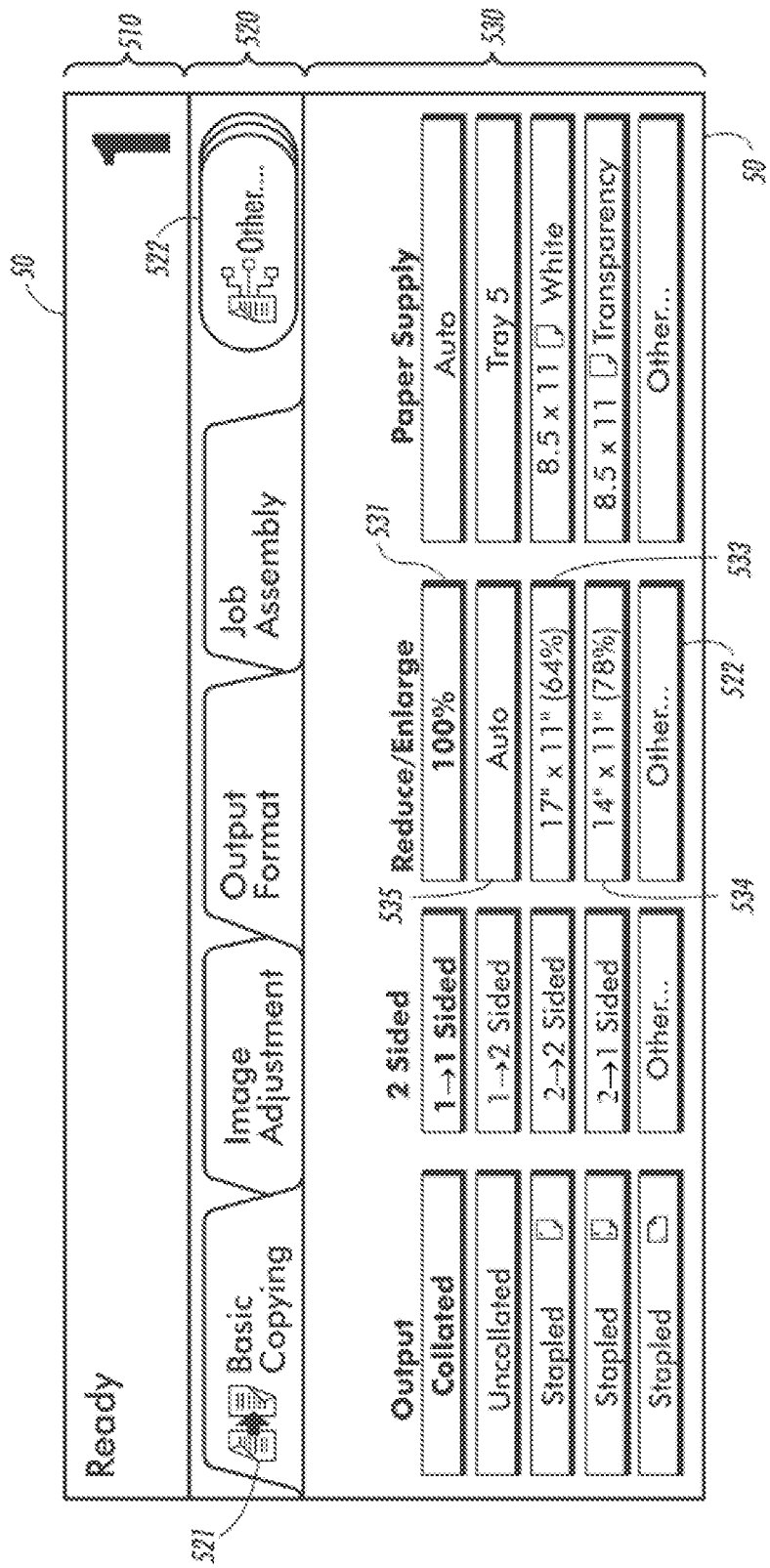
FIG. 3 illustrates a prior art user interface screen layout showing a main copying screen.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 4:
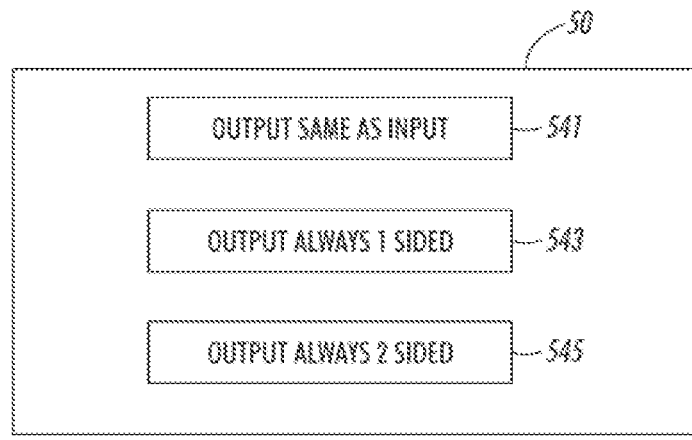
FIG. 4 illustrates a user interface screen layout showing available selectable plex relationships.

FIG. 4 illustrates a user interface screen layout showing available selectable plex relationships. As illustrated in FIG. 4, a user interface 50 includes activatable areas (541, 543, and 545).

With respect to FIG. 4, activatable area 541, when selected by a user, causes the digital multi-function device to reproduce either (1) a simplex original document, having multiple sheets, as a simplex document; (2) a duplex original document, having multiple sheets, as a duplex document; or a mixed simplex/duplex original document, having multiple sheets, as a mixed simplex/duplex document. This is illustrated in FIG. 5.

Figure 5:
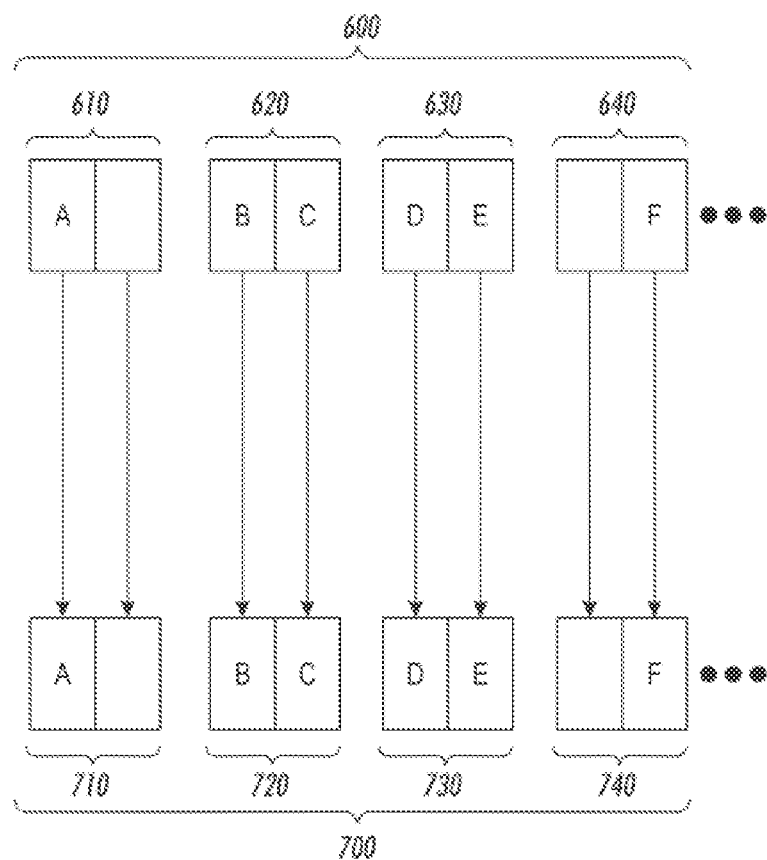
FIG. 5 illustrates an example of selecting a plex relationship wherein the output plex is the same as the input plex.

As illustrated in FIG. 5, a mixed simplex/duplex original document 600 has multiple sheets (610, 620, 630, and 640). Each sheet has a front side and a back side.

For example, sheet 610 has an image A on its front side and no image on its back side; sheet 620 has an image B on its front side and an image C on its back side; sheet 630 has an image D on its front side and an image E on its back side; and sheet 640 has no image on its front side and image F on its back side.

As illustrated in FIG. 5, the mixed simplex/duplex original document 600, having multiple sheets (610, 620, 630, and 640), is received by a scanner to be scanned. The scanner converts the mixed simplex/duplex original document 600 into an electronic document that is stored in an electronic pre-collation memory, wherein the electronic document has the same simplex/duplex characteristics of the mixed simplex/duplex original document 600.

For example, if the first input sheet (sheet 610 of FIG. 5) in the mixed simplex/duplex original document 600 is simplex, the electronic pre-collation memory stores the corresponding first output sheet (sheet 710 of FIG. 5) as simplex.

If the second input sheet (sheet 620 of FIG. 5) in the mixed simplex/duplex original document 600 is duplex, the electronic pre-collation memory stores the corresponding second output sheet (sheet 720 of FIG. 5) as duplex.

If the third input sheet (sheet 630 of FIG. 5) in the mixed simplex/duplex original document 600 is duplex, the electronic pre-collation memory stores the corresponding third output sheet (sheet 730 of FIG. 5) as duplex.

If the fourth input sheet (sheet 640 of FIG. 5) in the mixed simplex/duplex original document 600 is simplex, the electronic pre-collation memory stores the corresponding fourth output sheet (sheet 740 of FIG. 5) as simplex.

With respect to FIG. 4, activatable area 543, when selected by a user, causes the digital multi-function device to reproduce either (1) a simplex original document, having multiple sheets, as a simplex document; (2) a duplex original document, having multiple sheets, as a simplex document;

or a mixed simplex/duplex original document, having multiple sheets, as a simplex document. This is illustrated in FIG. 6.

Figure 6:
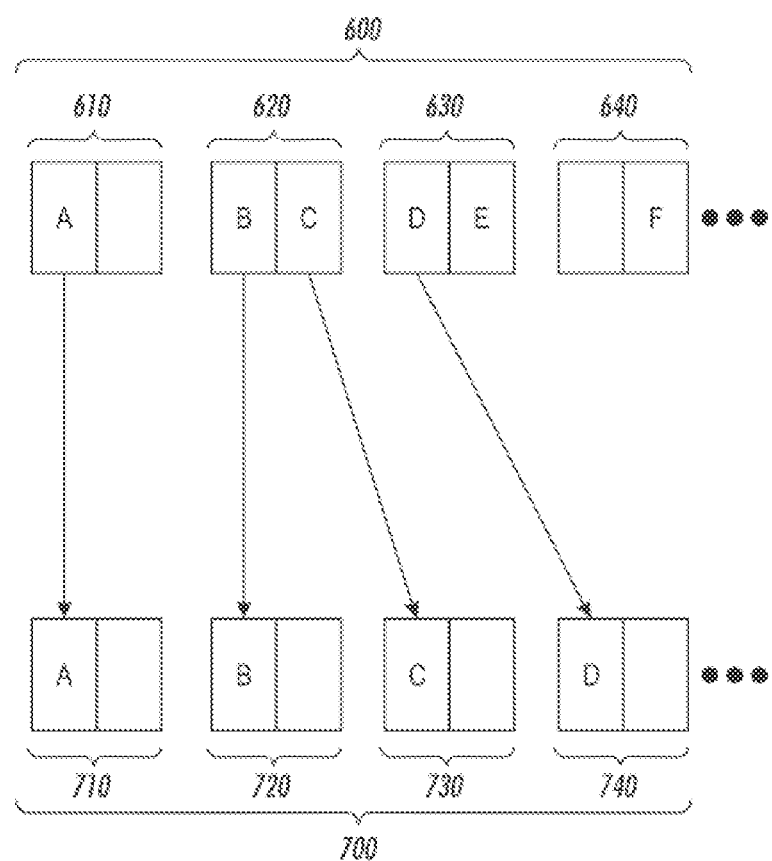
FIG. 6 illustrates an example of selecting a plex relationship wherein the output plex is always simplex (one-sided)

As illustrated in FIG. 6, a mixed simplex/duplex original document 600 has multiple sheets (610, 620, 630, and 640). Each sheet has a front side and a back side.

For example, sheet 610 has an image A on its front side and no image on its back side; sheet 620 has an image B on its front side and an image C on its back side; sheet 630 has an image D on its front side and an image E on its back side; and sheet 640 has no image on its front side and image F on its back side.

As illustrated in FIG. 6, the mixed simplex/duplex original document 600, having multiple sheets (610, 620, 630, and 640), is received by a scanner to be scanned. The scanner converts the mixed simplex/duplex original document 600 into an electronic document that is stored in an electronic pre-collation memory, wherein the electronic document has the same simplex/duplex characteristics of the mixed simplex/duplex original document 600.

For example, if the first input sheet (sheet 610 of FIG. 6) in the mixed simplex/duplex original document 600 is simplex, the electronic pre-collation memory stores the image of the front side of the first input sheet (sheet 610 of FIG. 6) as the image of front side of the first output sheet 720.

If the second input sheet (sheet 620 of FIG. 6) in the mixed simplex/duplex original document 600 is duplex, the electronic pre-collation memory breaks up the images to separate sheets. More specifically, the electronic pre-collation memory stores the image of the front side of the second input sheet (sheet 620 of FIG. 6) as the front side of the second output sheet (sheet 720 of FIG. 6) and stores the image of the back side of the second input sheet (sheet 620 of FIG. 6) as the image of the front side of the third output sheet (sheet 730 of FIG. 6).

If the third input sheet (sheet 630 of FIG. 6) in the mixed simplex/duplex original document 600 is duplex, the electronic pre-collation memory breaks up the images to separate sheets. More specifically, the electronic pre-collation memory stores the image of the front side of the third input sheet (sheet 630 of FIG. 6) as the image of the front side of the fourth output sheet 740, etc.

With respect to FIG. 4, activatable area 545, when selected by a user, causes the digital multi-function device to reproduce either (1) a simplex original document, having multiple sheets, as a duplex document; (2) a duplex original document, having multiple sheets, as a duplex document; or a mixed simplex/duplex original document, having multiple sheets, as a duplex document. This is illustrated in FIG. 7.

Figure 7:
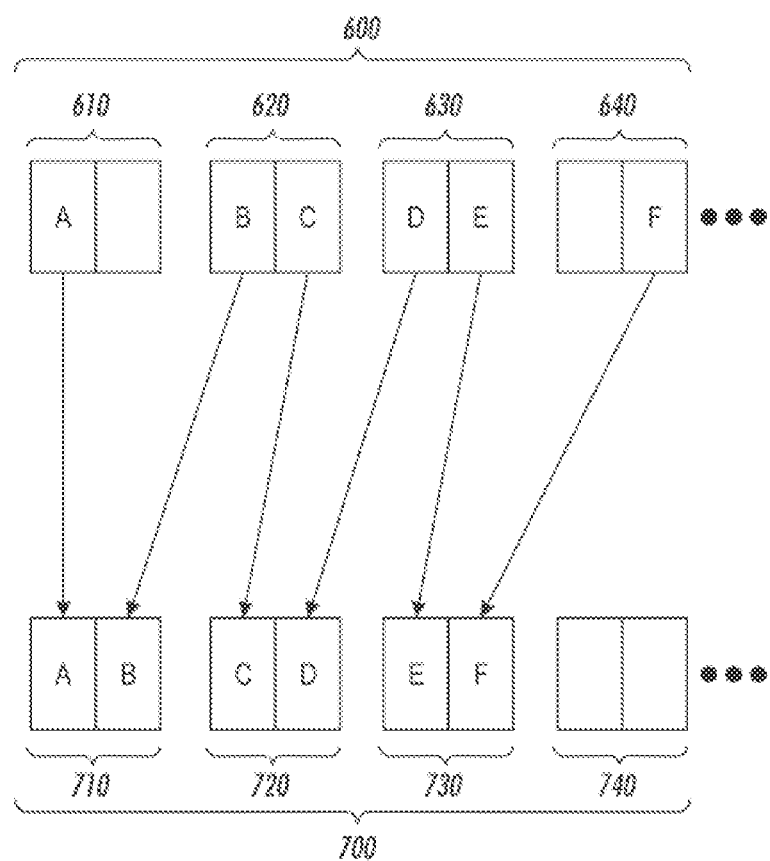
FIG. 7 illustrates an example of selecting a plex relationship wherein the output plex is always duplex (two-sided)

As illustrated in FIG. 7, a mixed simplex/duplex original document 600 has multiple sheets (610, 620, 630, and 640). Each sheet has a front side and a back side.

For example, sheet 610 has an image A on its front side and no image on its back side; sheet 620 has an image B on its front side and an image C on its back side; sheet 630 has an image D on its front side and an image E on its back side; and sheet 640 has no image on its front side and image F on its back side.

As illustrated in FIG. 7, the mixed simplex/duplex original document 600, having multiple sheets (610, 620, 630, and 640), is received by a scanner to be scanned. The scanner converts the mixed simplex/duplex original document 600 into an electronic document that is stored in an electronic pre-collation memory, wherein the electronic document has the same simplex/duplex characteristics of the mixed simplex/duplex original document 600.

For example, if the first input sheet (sheet 610 of FIG. 7) in the mixed simplex/duplex original document 600 is simplex, the electronic pre-collation memory stores the image from the first input sheet (sheet 610 of FIG. 7) as the front side of the first output sheet 710.

If the second input sheet (sheet 620 of FIG. 7) in the mixed simplex/duplex original document 600 is duplex, the electronic pre-collation memory breaks up the images to separate sheets. More specifically, the electronic pre-collation memory stores the image of the front side of the second input sheet (sheet 620 of FIG. 7) as the image of the back side of the first output sheet 710 and stores the image of the back side of the second input sheet (sheet 620 of FIG. 7) as the image of the front side of the second output sheet 720.

If the third input sheet (sheet 630 of FIG. 7) in the mixed simplex/duplex original document 600 is duplex, the electronic pre-collation memory breaks up the images to separate sheets. More specifically, the electronic pre-collation memory stores the image of the front side of the third input sheet (sheet 630 of FIG. 7) as the image of the back side of the third output sheet 730, etc.

If the fourth input sheet (sheet 640 of FIG. 7) in the mixed simplex/duplex original document 600 is simplex, the electronic pre-collation memory stores the image from the fourth input sheet (sheet 640 of FIG. 7) as the image of the back side of the third output sheet 730.

Figure 8:
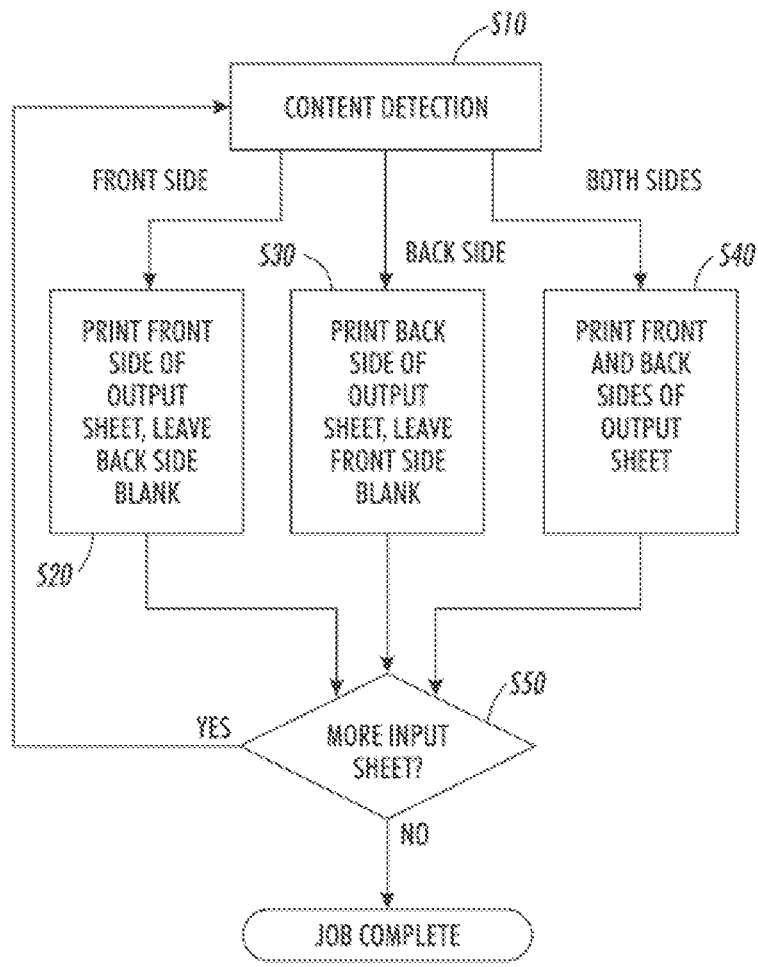
FIG. 8 illustrates a flowchart for a plex relationship wherein the output plex is the same as the input plex.

FIG. 8 illustrates a flowchart for a plex relationship wherein the output plex is the same as the input plex. As illustrated in FIG. 8, the scanned original document is processed by a conventional automatic page detection process to determine if an image is a front side and/or back side of the input sheet of the scanned original document, at step S10.

If the automatic page detection process, at step S10, determines that the input sheet is simplex and has an image on the front side, step S20 prints the front side of output sheet with the image from the front side of the input sheet and leaves back side blank.

If the automatic page detection process, at step S10, determines that the input sheet is simplex and has an image on the back side, step S30 prints the back side of output sheet with the image from the back side of the input sheet and leaves front side blank.

If the automatic page detection process, at step S10, determines that the input sheet is duplex, step S40 prints the front side of output sheet with the image from the front side of the input sheet and prints the back side of output sheet with the image from the back side of the input sheet.

At step S50, the process determines if more input sheets need to be processed. If the determines that more input sheets need to be processed, the process returns to step S10.

Figure 9:
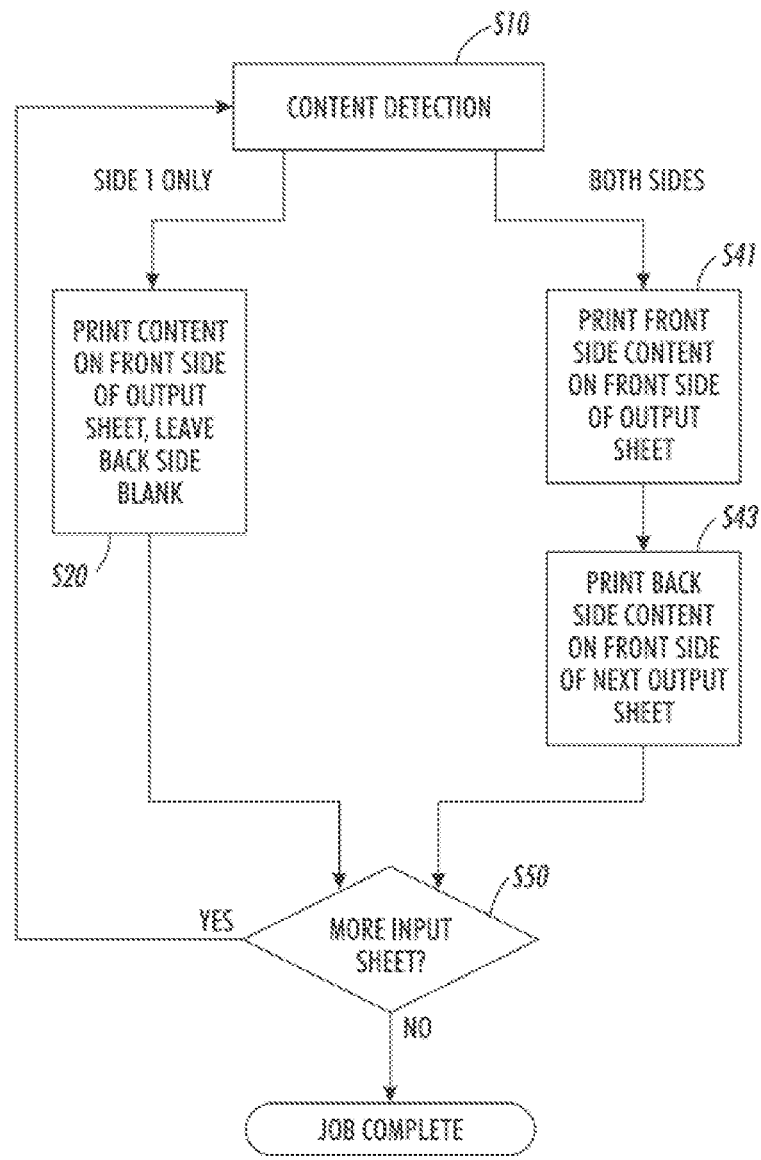
FIG. 9 illustrates a flowchart for a plex relationship wherein the output plex is always simplex (one-sided)

FIG. 9 illustrates a flowchart for a plex relationship wherein the output plex is always simplex (one-sided). As illustrated in FIG. 9, the scanned original document is processed by a conventional automatic page detection process to determine if an image is a front side and/or back side of the input sheet of the scanned original document, at step S10.

If the automatic page detection process, at step S10, determines that the input sheet is simplex, step S20 prints the front side of output sheet with the image from the input sheet and leaves back side blank.

If the automatic page detection process, at step S10, determines that the input sheet is duplex, step S41 prints the front side of output sheet with the image from the front side of the input sheet and leaves back side blank.

Thereafter, step S43 prints the front side of the next output sheet with the image from the back side of the input sheet and leaves back side of the next output sheet blank.

At step S50, the process determines if more input sheets need to be processed. If the determines that more input sheets need to be processed, the process returns to step S10.

Figure 10:
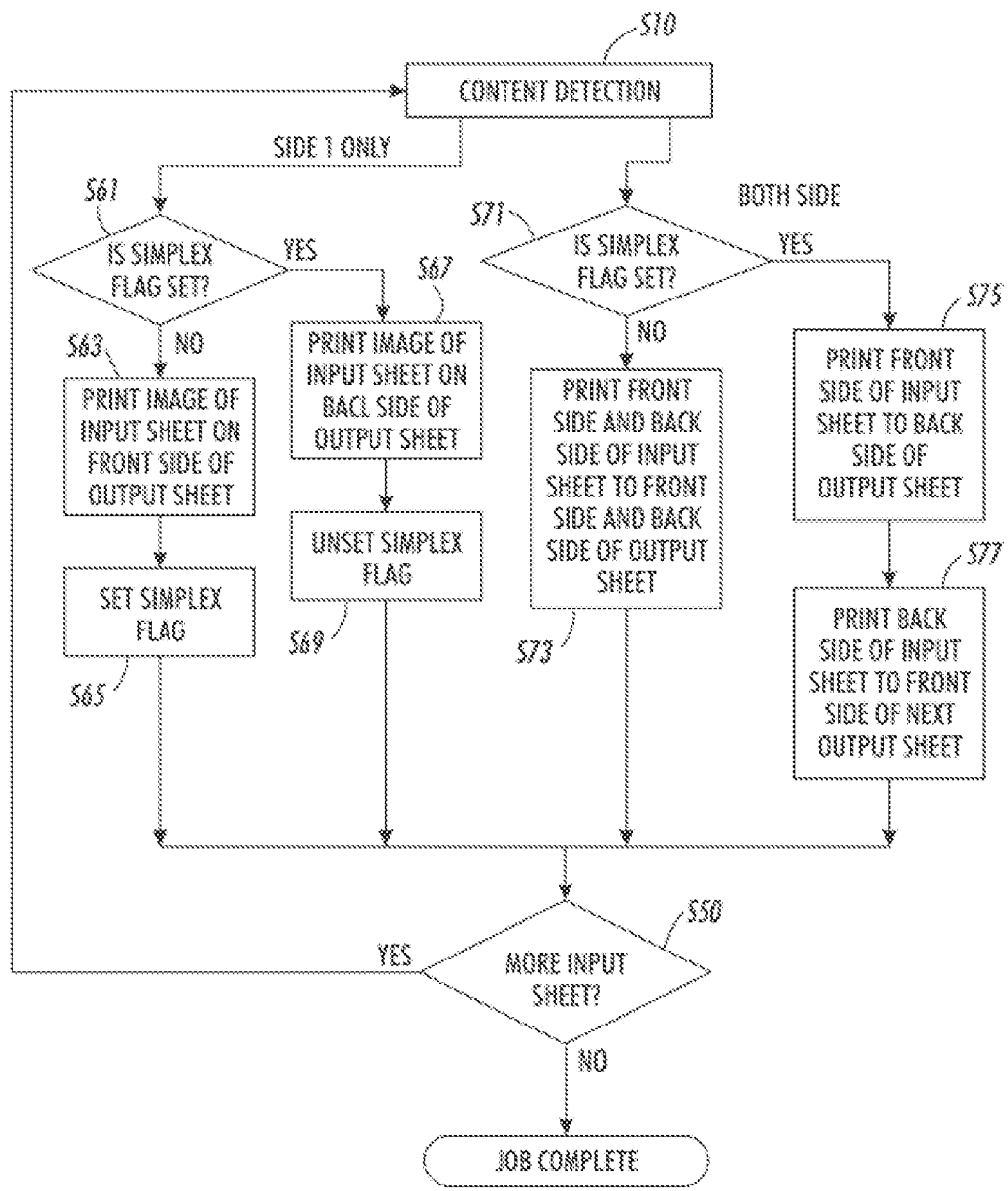
FIG. 10 illustrates a flowchart for a plex relationship wherein the output plex is always duplex (two-sided).

FIG. 10 illustrates a flowchart for a plex relationship wherein the output plex is always duplex (two-sided).

As illustrated in FIG. 10, the scanned original document is processed by a conventional automatic page detection process to determine if an image is a front side and/or back side of the input sheet of the scanned original document, at step S10.

If the automatic page detection process, at step S10, determines that the input sheet is simplex, step S61 determines if a simplex flag has been set.

If the simplex flag has been set, step S67 prints the back side of the output sheet with the image from the input sheet. Thereafter, step S69 unsets the simplex flag.

If the simplex flag has not been set, step S63 prints the front side of the output sheet with the image from the input sheet. Thereafter, step S65 sets the simplex flag.

If the automatic page detection process, at step S10, determines that the input sheet is duplex, step S61 determines if a simplex flag has been set.

If the simplex flag has been set, step S75 prints the back side of output sheet with the image from the front side of the input sheet. Thereafter, step S77 prints the front side of the next output sheet with the image from the back side of the input sheet.

If the simplex flag has not been set, step S73 prints the front side of the output sheet with the image from the front side of the input sheet and prints the back side of the output sheet with the image from the back side of the input sheet.

At step S50, the process determines if more input sheets need to be processed. If the determines that more input sheets need to be processed, the process returns to step S10.

In summary, a method for printing an output document from an original document having multiple input sheets, each input sheet having a front side and a back side, the output document having multiple output sheets, each output sheet having a front side and a back side, the output sheet of the output document having a same plex as a plex of a corresponding input sheet, comprises scanning the original document; determining if an input sheet of the scanned original document has an image only on a front side of the input sheet; determining if the input sheet of the scanned original document has an image only on a back side of the input sheet; determining if the input sheet of the scanned original document has an image on both a front side and a back side of the input sheet; printing, when it is determined that the input sheet of the scanned original document has an image only on a front side of the input sheet, a front side of an output sheet with an image from the front side of the input sheet and leaving a back side of the output sheet blank; printing, when it is determined that the input sheet of the scanned original document has an image only on a back side of the input sheet, a back side of an output sheet with an image from the back side of the input sheet and leaving a front side of the output sheet blank; and printing, when it is determined that the input sheet of the scanned original document has an image on both a front side and a back side of the input sheet, a front side of an output sheet with an image from the front side of the input sheet and a back side of the output sheet with an image from the back side of the input sheet.

A method for printing an output document from an original document having multiple input sheets, each input sheet having a front side and a back side, the output document having multiple output sheets, each output sheet having a front side and a back side, all output sheets of the output document being simplex, comprises scanning the original document; determining if an input sheet of the scanned original document has an image only on a front side of the input sheet; determining if the input sheet of the scanned original document has an image only on a back side of the input sheet; determining if the input sheet of the scanned original document has an image on both a front side and a back side of the input sheet; printing, when it is determined that the input sheet of the scanned original document has an image only on a front side of the input sheet, a front side of an output sheet with an image from the front side of the input sheet and leaving a back side of the output sheet blank; printing, when it is determined that the input sheet of the scanned original document has an image only on a back side of the input sheet, a front side of an output sheet with an image from the back side of the input sheet and leaving a back side of the output sheet blank; and printing, when it is determined that the input sheet of the scanned original document has an image on both a front side and a back side of the input sheet, a front side of an output sheet with an image from the front side of the input sheet and printing a front side of a next output sheet with an image from the back side of the input sheet.

A method for printing an output document from an original document having multiple input sheets, each input sheet having a front side and a back side, the output document having multiple output sheets, each output sheet having a front side and a back side, all output sheets of the output document being simplex, comprises scanning the original document; determining if an input sheet of the scanned original document has an image only on one side of the input sheet; determining if the input sheet of the scanned original document has an image on both a front side and a back side of the input sheet; determining if only one side of an output is available for printing; printing, when it is determined that the input sheet of the scanned original document has an image only on one side of the input sheet and only one side of an output is available for printing, a back side of an output sheet with an image from the input sheet; printing, when it is determined that the input sheet of the scanned original document has an image only on one side of the input sheet and it is determined that not only one side of an output is available for printing, a front side of an output sheet with an image from the input sheet; printing, when it is determined that the input sheet of the scanned original document has an image on both a front side and a back side of the input sheet and it is determined that not only one side of an output is available for printing, a front side of an output sheet with an image from the front side of the input sheet and a back side of the output sheet with an image from the back side of the input sheet; and printing, when it is determined that the input sheet of the scanned original document has an image on both a front side and a back side of the input sheet and it is determined that only one side of an output is available for printing, a back side of an output sheet with an image from the front side of the input sheet and a front side of a next output sheet with an image from the back side of the input sheet.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for printing an output document from an original document having multiple input sheets, each input sheet having a front side and a back side, the output document having multiple output sheets, each output sheet having a front side and a back side, all output sheets of the output document being printed in a simplex mode, comprising:

(a) duplex scanning the original document;

(b) determining if an input sheet of the scanned original document has an image only on a front side of the input sheet;

(c) determining if the input sheet of the scanned original document has an image only on a back side of the input sheet;

(d) determining if the input sheet of the scanned original document has an image on both a front side and a back side of the input sheet;

(e) storing, in an electronic pre-collation memory, when it is determined that the input sheet of the scanned original document has a non-blank image only on a front side of the input sheet, the non-blank image from the front side of the input sheet as a front side of an electronic output sheet to be printed and a blank image as a back side of the electronic output sheet to be printed;

(f) storing, in the electronic pre-collation memory, when it is determined that the input sheet of the scanned original document has a non-blank image only on a back side of the input sheet, the non-blank image from the back side of the input sheet as a front side of an output sheet and a blank image as a back side of the electronic output sheet to be printed;

(g) storing, in the electronic pre-collation memory, when it is determined that the input sheet of the scanned original document has a non-blank image on a front side and a non-blank image on a back side of the input sheet, the non-blank image from the front side of the input sheet as a front side of an electronic output sheet to be printed and the non-blank image from the back side of the input sheet as a front side of a next electronic output sheet to be printed; and (h) printing, using a printer in a simplex printing mode, only the front side of each electronic output sheet stored in the electronic pre-collation memory.

* * * * *